Nov. 6, 1951        C. F. PETERSON        2,574,057

RESILIENT SEAT MOUNT

Filed Aug. 28, 1950

Clarence F. Peterson

INVENTOR.

BY *Clarence A. O'Brien*
*and Harvey B. Jacobson*
Attorneys

UNITED STATES PATENT OFFICE 2,574,057

RESILIENT SEAT MOUNT

Clarence F. Peterson, Filer, Idaho

Application August 28, 1950, Serial No. 181,866

2 Claims. (Cl. 155—51)

This invention relates to new and useful improvements and structural refinements in mounts for seats on tractors and other agricultural implements, and the principal object of the invention is to prevent the transmission of vibration and shock from the tractor or implement to the seat of the operator.

The above object is achieved by the provision of means for mounting the seat for resiliently controlled rising and falling movement, an important feature of the invention residing in the structural arrangement of the mount itself, while another feature lies in the provision of a shock absorber which cooperates with the resilient mounting means.

Some of the advantages of the invention lie in its simplicity of construction, in its efficient operation, and in its adaptability for use on tractors and implements of different types.

With the above more important object and features in view and such other objects and features as may become apparent as this specification proceeds, the invention consists essentially of the arrangement and construction of parts as illustrated in the accompanying drawings, in which.

Like characters of reference are employed to designate like parts in the specification and throughout the several views.

Figure 3:
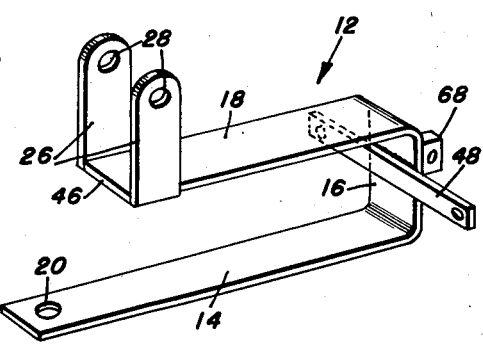
Figure 3 is a perspective view of the base member used in the invention.

Referring now to the accompanying drawings in detail, the invention is embodied in a resilient seat mount which is designated generally by the reference character 10 and includes in its construction a base member 12, preferably assuming the form of a strap which is angulated so as to provide a horizontal bottom portion 14, a vertical portion 16 at the rear end of the bottom portion and a forwardly extending horizontal portion 18 at the upper end of the vertical portion, as is best shown in Figure 3.

The portion 14 is provided at the forward end thereof with an aperture 20 to receive a screw 22 whereby the entire device may be secured to the frame 24 of a tractor or some other implement, while a pair of transversely spaced, upstanding ears 26 are provided at the forward end of the portion 18 and are formed with transversely aligned apertures 28 receiving a fulcrum pin 30.

Figure 1:
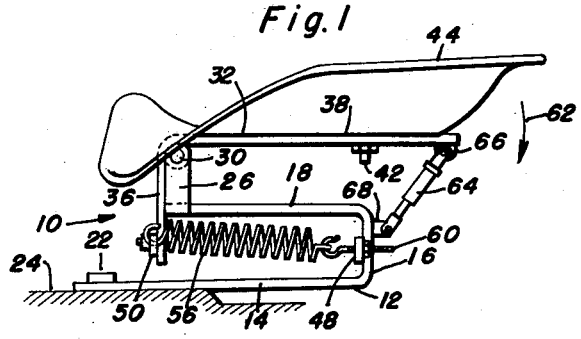
Figure 1 is a side elevational view of the invention.
Figure 2:
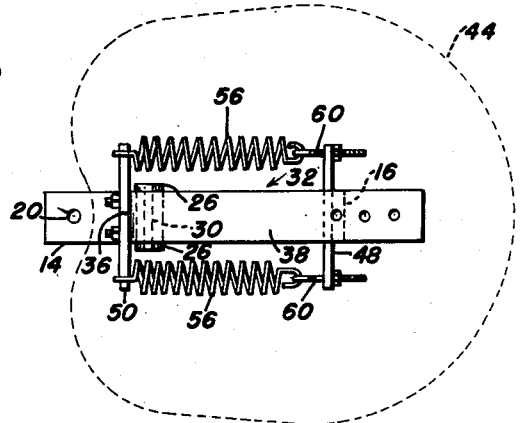
Figure 2 is a top plan view thereof with the seat proper removed.
Figure 4:
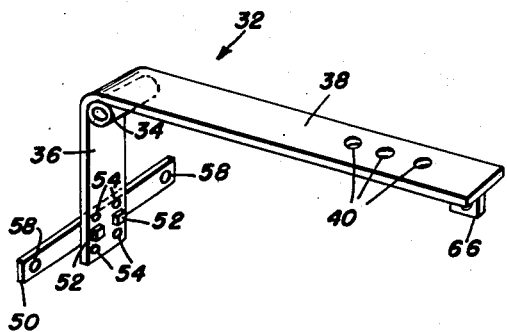
Figure 4 is a perspective view of the seat supporting angle bracket.

A seat supporting angle bracket 32 is provided at the corner portion thereof with a tubular bearing 34 which is pivotally mounted on the pin 30, the bracket 32 affording a downwardly extending arm 36 and a rearwardly extending arm 38, as shown in Figure 4. The rear end portion of the arm 38 is formed with a row of apertures 40 to selectively receive a fastening element 42 whereby a conventional seat 44 may be adjustably secured to the bracket 32, and as is best shown in Figure 1, the arm 36 is adapted to engage the forward edge 46 of the portion 18, which edge provides a stop for limiting the upward swinging movement of the seat 44.

A cross bar 48 is welded to the portion 16 of the base member 12 and projects laterally to both sides thereof, while a similar cross bar 50 is adjustably secured to the arm 36 by a plurality of fastening elements 52 which are receivable selectively in sets of apertures 54 provided in the arm.

A pair of tension springs 56 extend between the cross bars 48, 50 at the opposite sides of the base member 12, the springs 56 being anchored at one end in suitable apertures 58 provided in the cross bar 50, while the remaining ends of the springs are connected to adjustable screw hooks 60 which are carried by the cross bar 48. By virtue of these screw hooks the tension of the springs 56 may be varied so as to correspondingly vary the resistance which the springs offer to downward swinging movement of the seat 44 as indicated by the arrows 62 in Figure 1.

If desired, an elongated, compression resisting shock absorber of a spring, hydraulic or any other conventional type, illustrated at 64 may be pivotally connected to apertured lugs 66, 68 at the rear end of the arm 38 and on the portion 16 of the base member 12 respectively, so as to cooperate with the springs 56 in resisting vibration and shock.

It is believed that the advantages and use of the invention will be clearly understood from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

1. In a seat structure of the type described, the combination of a base member adapted to be secured to a support and including a vertical portion, a forwardly extending horizontal portion at the upper end of the vertical portion, and a pair of transversely spaced upstanding ears at the forward end of said horizontal portion, a horizontal fulcrum pin extending transversely through said ears, an angle bracket having a corner portion pivotally mounted on said pin and affording a rearwardly extending arm and a downwardly extending arm, a seat mounted on the rearwardly extending arm, said downwardly extending arm being engageable with the front edge of said horizontal portion whereby to limit upward swinging of said seat, a pair of cross bars secured to and projecting to both sides of the downwardly extending arm and the vertical portion of said base member, and a pair of tension springs extending between the ends of said cross bar whereby to resist downward movement of said seat.

2. The device as defined in claim 1 together with a compression resisting shock absorber extending between the vertical portion of said base member and the rear end of said rearwardly extending arm.

CLARENCE F. PETERSON.

REFERENCES CITED

The following references are of record in the file of this patent:

UNITED STATES PATENTS

| Number | Name | Date |
|---|---|---|
| 1,174,429 | McCrea | Mar. 7, 1916 |
| 1,305,771 | Clark | June 3, 1919 |
| 1,390,865 | Bangle | Sept. 13, 1921 |
| 2,516,172 | Baldwin | July 25, 1950 |